(12) United States Patent
O'Hare

(10) Patent No.: US 8,978,689 B2
(45) Date of Patent: Mar. 17, 2015

(54) SYSTEM AND METHOD FOR SUPPLYING NATURAL GAS TO A SALES LINE

(76) Inventor: Greg Albert O'Hare, Kitscoty (CA)

( * ) Notice: Subject to any disclaimer, the term of this patent is extended or adjusted under 35 U.S.C. 154(b) by 316 days.

(21) Appl. No.: 13/178,087

(22) Filed: Jul. 7, 2011

(65) Prior Publication Data

US 2013/0008516 A1 Jan. 10, 2013

(51) Int. Cl.
*E03B 7/00* (2006.01)
*F16K 15/00* (2006.01)

(52) U.S. Cl.
CPC .................................... *F16K 15/00* (2013.01)
USPC ...................................................... 137/236.1

(58) Field of Classification Search
USPC ......... 137/236.1, 255, 263, 266; 48/190, 195; 73/23.2, 23.31, 23.24; 705/412
See application file for complete search history.

(56) References Cited

U.S. PATENT DOCUMENTS

| | | | |
|---|---|---|---|
| 1,095,935 A * | 5/1914 | Sheldon | 251/30.01 |
| 1,680,255 A * | 8/1928 | Poston | 55/465 |
| 1,930,848 A * | 10/1933 | Ashley et al. | 261/76 |
| 3,934,454 A | 1/1976 | Simo | |
| 5,730,166 A * | 3/1998 | Ackerley et al. | 137/2 |
| 5,748,492 A * | 5/1998 | Vander Heyden et al. | 702/30 |
| 6,279,387 B1 | 8/2001 | Kikuchi | |
| 6,327,541 B1 * | 12/2001 | Pitchford et al. | 702/62 |
| 6,551,570 B1 * | 4/2003 | Smith et al. | 423/574.1 |
| 7,763,474 B2 | 7/2010 | Hassell | |
| 2002/0134547 A1 * | 9/2002 | Demone | 166/77.1 |
| 2006/0141637 A1 * | 6/2006 | Hassell, Jr. | 436/180 |
| 2008/0066619 A1 * | 3/2008 | Petinarides | 96/4 |

OTHER PUBLICATIONS

"DynaPak Gas Sampler", YZ Systems [online], 2002, http://www.yzsystems.com/Files/YZ_Systems/Global/US-en/dynapak/DP_2010_02042002ATEX.r12.04.pdf.
Protest filed in Canada against corresponding Canadian Patent Application CA2,746,245.
"Sample Cylinder", Ham-Let Advanced Control Technology [online], http://www.precisionfluid.it/files/SAMPLE%20CYLINDER.pdf, best known date: Mar. 2004.
"Y-Strainers", Sure Flow Equipment Inc. [online], http://sureflowequipment.com/strainers/y_strainer_index.cfm, best known date: Feb. 2004.

* cited by examiner

*Primary Examiner* — John K Fristoe, Jr.
*Assistant Examiner* — Kevin E Lynn
(74) *Attorney, Agent, or Firm* — Anthony R. Lambert

(57) ABSTRACT

A system is disclosed for supplying natural gas to a sales line, the system comprising: an inlet connected to receive natural gas from a well; an outlet connected to discharge the natural gas to a sales line; piping between the inlet and the outlet; a moisture sensor on the piping for detection of a predetermined moisture level in the natural gas; a shutdown valve, on the piping, connected to close upon detection by the moisture sensor of a moisture level at or above the predetermined moisture level; an odorant addition unit on the piping; and a gas analyzer on the piping for tracking the volume and heating value of natural gas discharged through the outlet. A method of supplying natural gas to a sales line is also disclosed.

4 Claims, 1 Drawing Sheet

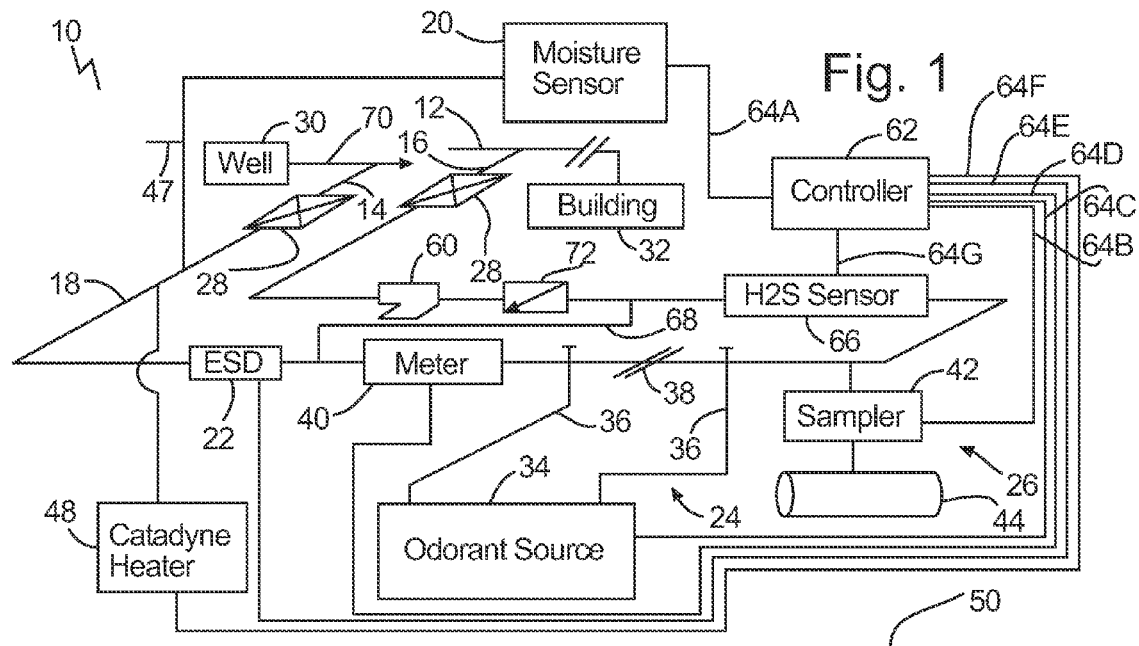

Fig. 1

Supplying natural gas from a well into piping that discharges into a sales line. — 50

Monitoring the moisture level of natural gas in the piping. — 52

Opening a shutdown valve on the piping when the moisture level is below a predetermined moisture level. — 54

Adding odorant to natural gas in the piping. — 56

Tracking the volume and heating value of natural gas discharged from the piping into the sales line. — 58

Fig. 2

SYSTEM AND METHOD FOR SUPPLYING NATURAL GAS TO A SALES LINE

TECHNICAL FIELD

This document relates to systems and methods for supplying natural gas to a sales line.

BACKGROUND

Natural gas produced from a well is sent downstream to a processing facility such as a refinery, ultimately being discharged into a sales line after processing for distribution to consumers.

SUMMARY

A system is disclosed for supplying natural gas to a sales line, the system comprising: an inlet connected to receive natural gas from a well; an outlet connected to discharge the natural gas to a sales line; piping between the inlet and the outlet; a moisture sensor on the piping for detection of a predetermined moisture level in the natural gas; a shutdown valve, on the piping, connected to close upon detection by the moisture sensor of a moisture level at or above the predetermined moisture level; an odorant addition unit on the piping; and a gas analyzer on the piping for tracking the volume and heating value of natural gas discharged through the outlet.

A method is also disclosed of supplying natural gas to a sales line, the method comprising: supplying natural gas from a well into piping that discharges into a sales line; monitoring the moisture level of natural gas in the piping; opening a shutdown valve on the piping when the moisture level is below a predetermined moisture level; adding odorant to natural gas in the piping; tracking the volume and heating value of natural gas discharged from the piping into the sales line.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a schematic of a system for supplying natural gas to a sales line.

FIG. 2 is a flow diagram of a method of supplying natural gas to a sales line.

DETAILED DESCRIPTION

Immaterial modifications may be made to the embodiments described here without departing from what is covered by the claims.

Referring to FIG. 1, a system 10 for supplying natural gas to a sales line 12 is illustrated. System 10 comprises an inlet 14, an outlet 16, piping 18 between the inlet 14 and outlet 16, a moisture sensor 20, a shutdown valve 22, an odorant addition unit 24, and a gas analyzer 26. Inlet 14 and outlet 16 may comprise respective valves 28. Inlet 14 is connected to receive natural gas from one or more wells 30. Outlet 16 is connected to discharge the natural gas to sales line 12. Moisture sensor 20 is on the piping 18 for detection of a predetermined moisture level, such as a maximum moisture content in the natural gas as set by regulation for supply of natural gas to one or more buildings 32. Shutdown valve 22, which may be an emergency shutdown valve (ESD) as shown, is on the piping 18 and is connected to close upon detection by the moisture sensor 20 of a moisture level at or above the predetermined moisture level. Odorant addition unit 24 is on the piping 18, and may further comprise an odorant source 34, one or more lines 36 to piping 18, and an orifice plate 38, the combined function of which is known in the industry for dispensing controlled amounts of scent or odor. Odorant source 34 contains one or more suitable odorants, such as t-butyl mercaptan, thiophane, ethyl mercaptan, dimethyl sulfide, or other odorants as required by regulation or as desired. Gas analyzer 26 is on the piping 18 for tracking the heating value of natural gas discharged through the outlet 16. Gas analyzer 26 may further comprise a sampler 42, which may further include a sample storage apparatus such as a cylinder 44. Volume meter 40 is on the piping 18 for tracking the volume of natural gas discharged through the outlet 16. Meter 40 may include a correction device (not shown). The cylinder 44 is an example of one or more parts that may be removed from the gas analyzer 44 for use in determining compensation for the natural gas discharged through the outlet 16. For example, sampler 42, such as a DYNAPAK™ sampler may take a predetermined size of sample at a predetermined time interval, and store the sample in cylinder 44 for later analysis. Periodically, cylinder 44 may be removed from system 10 and analyzed to determine the average heating value of the natural gas contained within the cylinder. The average heating value may then be used with the flow data from meter 40 to determine the estimated total value of the natural discharged into the sales line 12 for the purpose of billing a customer such as a natural gas distributor for the cost of the natural gas received in sales line 12. Sales line 12 may be a suitable commercial gas line that might be supplying a house or community with natural gas.

Other components may be present. System 10 may further comprise a natural gas powered generator (not shown), connected to receive natural gas from the piping 18 to supply power to one or more of the moisture sensor 20, the shutdown valve 22, the odorant addition unit 24, and the gas analyzer 26. The generator may also be used to power any or all of the system components that require power to operate. Other power sources may be used. An instrument gas takeoff 47 may be connected to receive natural gas from the piping 18 to supply instrument pressure to one or more system components, such as the shutdown valve 22, which may require gas pressure to open and close. A catadyne heater 48 may be connected to receive natural gas from the piping 18. Heater 48 may be advantageous in colder climates or in areas where the nighttime temperature drop is sufficient to warrant a heater. A check valve 72 may be located on the piping 18 for ensuring one way flow to outlet 16. A separator 60, such as a y strainer as shown or a filter, may be on the piping 18 for at least partial removal of liquids and solids from the natural gas. Separator 60 may comprise a dryer (not shown) in some embodiments. A hydrogen sulfide sensor 66 may be on the piping 18. A bypass 68 may be on the piping 18. Bypass 68 may bypass one or more system components, such as the gas analyzer 26 and the odorant addition unit 34 as shown. Bypass may allow work to be done on system 10 without disrupting the flow of gas through piping 18. One or more valves (not shown) may be provided to operate bypass 68 as desired. Various fittings, regulators, piping, and other components not shown may be required to implement system 10. One or more of inlet 14 and outlet 16 may tie in to a respective compressor (not shown) for assisting transport to piping 18 or sales line 12.

System 10 may further comprise a controller 62 connected to one or more system components, such as one or more of the moisture sensor 20, the shutdown valve 22, the odorant addition unit 24, and the gas analyzer 26. In the example shown, controller 62 is connected by control lines 64A-G to moisture sensor 20, sampler 42, odorant addition unit 24, meter 40, shutdown valve 22, heater 48, and H2S sensor 66, respectively. Other components such as valves 28 and 72 may be connected to controller 62. Controller 62 may be adapted to store information, such as if controller 62 comprises a computer data storage medium for storing data from sensors in the system 10. Controller 62 may also be adapted transmit information, for example through a wired or wireless modem (not shown) to a remote site. Controller 62 may be operated on site or by remote. Controller 62 may be powered by one or more suitable power source such as a generator or one or more solar panels (not shown). Controller 62 may be a supervisory control and data acquisition (SCADA) system.

System 10 may be located at a well site, for example with inlet 14 connected to a production line 70 from one or more wells 30. System 10 may be a portable system designed to shunt natural gas, such as unprocessed natural gas, from transit to a refinery or other process equipment if the natural gas is of sufficient quality for supply to a sales line. Thus, system 10 is able to take advantage of the presence of produced gas of high quality by avoiding sending such gas through the unnecessary and costly step of processing in a refinery. System 10 may also be designed to run automatically, such that system 10 provides an automatic diverter for such gas, requiring little attention other than periodic visits to obtain flow meter information and to replace cylinder 44 in one embodiment. System 10 may also be portable, for example if system 10 is located on wheels or a skid (not shown) for ease of transport to a suitable location. System 10 may include a protective housing (not shown), such as a shed for containing the components of system 10. Additional space may be provided in the housing for allowing a user to perform maintenance or otherwise access system 10 while avoiding the conditions of the external environment. System 10 may also be located at a distance from the well 30, for example along piping (not shown) to a refinery.

Referring to FIG. 1, the method shown in FIG. 2 of supplying natural gas to a sales line 12 will now be described with reference to the method stages shown in FIG. 2. In a stage 50, natural gas is supplied from a well 30 into piping 18 that discharges into a sales line 12. In a stage 52, the moisture level of natural gas in the piping 18 is monitored. In a stage 54, shutdown valve 22 on the piping 18 is opened when the moisture level is below a predetermined moisture level, such as the maximum moisture level as set by regulation or as desired. If no information is obtainable from sensor 20 for example due to malfunction, or in the case of detection of a component malfunction anywhere in system 10, system 10 may respond by shutting valve 22 to prevent further discharge of natural gas from outlet 16. In a stage 56, odorant is added to natural gas in the piping 18. In a stage 58, the volume and heating value of natural gas discharged from the piping 18 into the sales line 12 is tracked, for example by monitoring the volume of natural gas passing through the piping 18 with meter 40, and sampling the natural gas with sampler 42 at predetermined intervals. The method may include other stages such as at least partially removing liquids and solids from the natural gas in the piping 18 using separator 60, monitoring the hydrogen sulfide level of natural gas in the piping 18 with H2S sensor 66, supplying natural gas to one or more buildings 32 from the sales line 12, and removing one or more parts such as cylinder 44 from the gas analyzer 26 and using the one or more parts for determining compensation for the natural gas discharged through the outlet 16. Suitable methods may incorporate other stages not discussed.

Although the system 10 illustrated in FIG. 1 shows a suitable layout of components, other arrangements may be used. For example, meter 40 may be located downstream of odorant addition unit 24. In addition, H2S sensor 66 may be located before shutdown valve 22 to provide earlier warning of the presence of unsuitable H2S levels in the natural gas. Other arrangements may be used.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A system for supplying natural gas to a sales line, the system comprising:
    an inlet connected to receive natural gas from a well;
    an outlet connected to discharge the natural gas to a sales line;
    piping between the inlet and the outlet, the piping including a check valve and a hydrogen sulfide sensor;
    a separator on the piping for at least partial removal of liquids and solids from the natural gas;
    a heater connected to receive natural gas from the piping;
    a moisture sensor on the piping for detection of a predetermined moisture level in the natural gas;
    a shutdown valve, on the piping, connected to close upon detection by the moisture sensor of a moisture level at or above the predetermined moisture level;
    an odorant addition unit on the piping;
    a gas analyzer on the piping for tracking the heating value of natural gas discharged through the outlet, the gas analyzer comprising a cylinder that may be removed from the gas analyzer for use in determining compensation for the natural gas discharged through the outlet;
    an instrument gas takeoff, connected to receive natural gas from the piping to supply instrument pressure to the shutdown valve;
    a meter for tracking the volume of natural gas discharged through the outlet;
    a controller connected for controlling operation of the moisture sensor, the shutdown valve, the odorant addition unit, and the gas analyzer; and
    in which the system is configured to be portable on wheels or a skid, and the heater, moisture sensor, shutdown valve, odorant addition unit, gas analyzer, and instrument gas takeoff are contained within a housing mounted on the wheels or skid.

2. The system of claim 1 in which the heater is a catadyne heater.

3. The system of claim 1 located at a well site, the sales line is connected to supply natural gas to one or more buildings and further comprising a bypass on the piping for bypassing the gas analyzer and the odorant addition unit.

4. The system of claim 3 in which the separator comprises a Y strainer.

* * * * *